United States Patent [19]

Le Balc'h

[11] Patent Number: 4,935,277

[45] Date of Patent: Jun. 19, 1990

[54] BLADE CONSTRUCTED OF COMPOSITE MATERIALS, HAVING A STRUCTURAL CORE AND A COVERING OF PROFILED CLADDING, AND PROCESS FOR MANUFACTURING THE SAME

[75] Inventor: Maurice Y. M. Le Balc'h, Marly La Ville, France

[73] Assignee: Aerospatiale Société Nationale Industrielle, Paris, France

[21] Appl. No.: 210,254

[22] Filed: Jun. 23, 1988

[30] Foreign Application Priority Data

Jun. 26, 1987 [FR] France ................. 87 09078

[51] Int. Cl.$^5$ .................. B32B 3/26; B64C 11/06
[52] U.S. Cl. ................... 428/71; 244/123;
416/229 R; 416/230; 416/241 A; 428/73;
428/116; 428/157; 428/159; 428/160;
428/304.4; 428/316.6
[58] Field of Search ................. 244/123, 124;
416/229 R, 230, 241 A; 428/71, 73, 116, 119,
120, 157, 159, 160, 304.4, 316.6

[56] References Cited

U.S. PATENT DOCUMENTS

| | | | |
|---|---|---|---|
| 3,028,292 | 4/1962 | Hinds | 244/123 |
| 4,268,571 | 5/1981 | McCarthy | 416/229 R |
| 4,335,174 | 6/1982 | Belko | 428/73 |
| 4,335,182 | 6/1982 | Brand et al. | 428/159 |
| 4,626,172 | 12/1986 | Mouille et al. | 416/229 R |
| 4,664,974 | 5/1987 | Sherwood | 428/71 |
| 4,753,836 | 6/1988 | Mizell | 428/71 |

*Primary Examiner*—William J. Van Balen
*Attorney, Agent, or Firm*—Pollock, Vande Sande & Priddy

[57] ABSTRACT

Helicopter rotor blade constructed of composite materials has a structural core (1) and a covering of profiled cladding (8). The structural core (1) includes all the structural elements of the blade, while the covering of the cladding (8) is a non-stress-bearing covering comprising an external rigid and thin shell (9a-9b), with the desired aerodynamic porfile, and a layer (10a-10b) of a ligth and flexible comformable non-stress-bearing material, such as a foam, ensuring the filling between the structural core (1) and the external shell (9a-9b). The foam layer (10a-10b) absorbs and compensates for the differences in shape between the contour of the structural core (1) and the precise aerodynamic profile of the non-stress-bearing external shell (9a-9b). The blade covering is expendable and evolutive spanwise as well as chordwise, with an external shell exhibiting an excellent surface condition, good erosion behavior and impact resistance, and easy to repair.

33 Claims, 2 Drawing Sheets

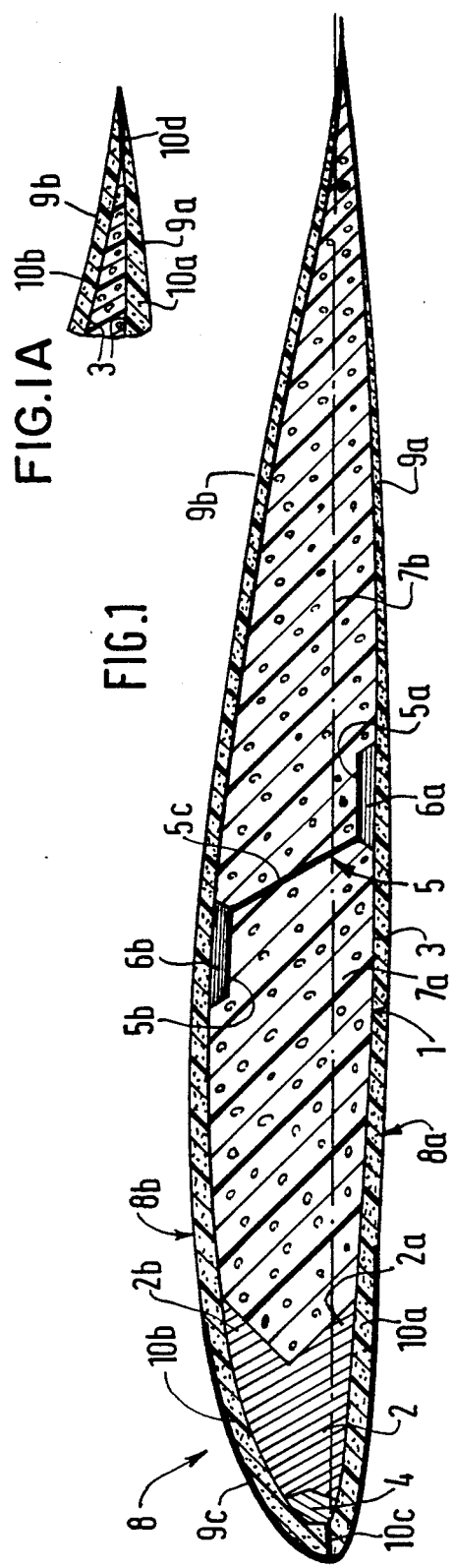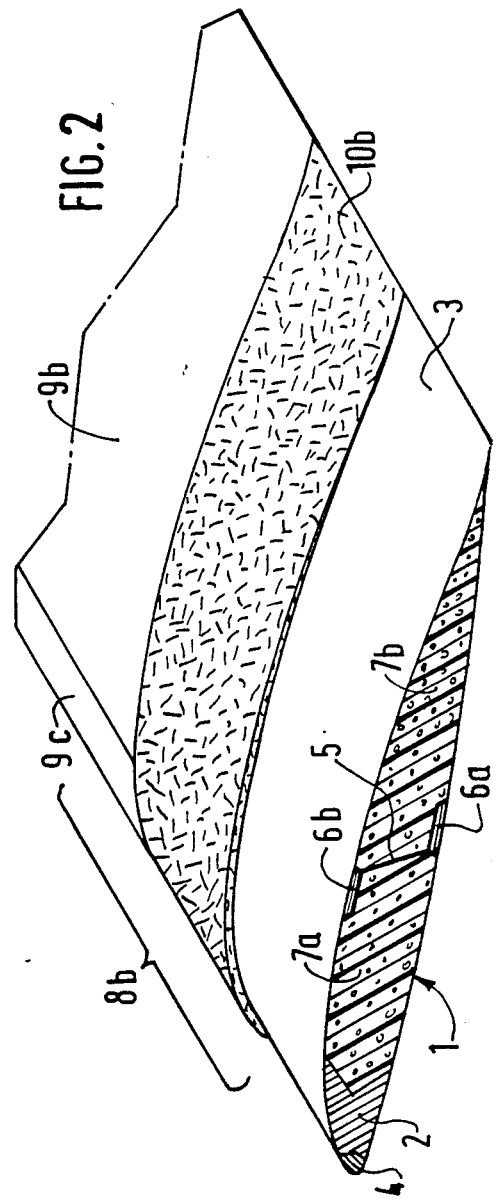

ID OF THE INVENTION

The present invention relates to blades constructed of composite materials, intended, in particular, to equip the rotors of aerodynes having an at least partially rotating rotor system, such as helicopters.

More specifically, the invention relates to such a blade having a structural core and having a covering of profiled cladding, as well as to a process for manufacturing such a blade.

BACKGROUND OF THE INVENTION

It is known that the blades constructed of composite materials and currently produced for rotors of rotor aircraft generally include at least one spar, in general consisting of rovings of fibers of high mechanical resistance which are agglomerated by a polymerized synthetic resin and which permit the absorption of the centrifugal forces and of a part of the bending moments which are exerted on the blade in rotation; an external shell which is rigid and profiled to the final profile of the corresponding blade and which is a stress-bearing covering in general consisting of a plurality of layers which are superposed, and preferably crossed, of fabrics of fibers having high mechanical resistance which are rigidified by a polymerized synthetic resin, the covering contributing, with the spar, to withstanding the bending moments and furthermore transmitting the torsion couples which are exerted on the blade; and at least one filling element constructed of a light synthetic material, such as a cellular or foam material, or alternatively a honeycomb material, which is disposed within the stress-bearing external shell in order to fill at least partially the internal volume of the latter and complimentary to that of the spar or spars which likewise traverse this stress-bearing external shell in the longitudinal direction.

In a blade having this conventional structure, the spar, the filling element or elements and the stress-bearing and profiled external shell are the essential elements which participate in the structural resistance of the blade, and which therefore bear the various forces and bending and torsion moments to which the blade is subjected on account of the static, dynamic and aerodynamic loads which are exerted on it, when the rotor of the rotor aircraft is in operation.

The construction of such blades presents a certain number of difficulties, especially on account of the fact that the external shell must, in addition to its aptitude for structural resistance, exhibit at the same time the precise desired aerodynamic profile and likewise good qualities of surface condition, of erosion behavior and of resistance to impacts.

The resistance to impacts and the erosion behavior assume respectively an oversizing of the structural elements and the presence, on the external shell, of at least one supplementary protective layer; this gives rise to a penalty in terms of mass. The obtaining of the precise desired aerodynamic profile and good qualities of surface condition implies, for the manufacture, the utilization of precision equipment, particularly of molds having very low tolerance, and the performance of lengthy and delicate finishing operations, particularly caulkings, fillings, sandings and paintings. This results in a large additional manufacturing cost.

Furthermore, as the covering is structural, it is impossible, in the event of damage, to proceed in situ with simplified repair operations, and it is necessary to demount the blade and to return it to the factory, to restore and then to check the structural integrity of the blade, or to replace it in the event of major damage. It is therefore impossible to repair the profile without repairing the entire blade.

Finally, it is impossible to modify the profile without completely changing the blade in the event, for example, of necessary development of the rotor following a reassessment of the aerodyne.

Moreover, in the field of helicopter rotor blades comprising a trailing edge panel which consists, on the one hand, of a honeycomb web on which are affixed an upper surface skin and a lower surface skin and, on the other hand, which is closed at its internal radial end (turned towards the blade root or towards the hub) by a plug constructed of elastomer, it has been proposed in U.S. Pat. No. 4,335,174 to affix an adhesive band impregnated with a thermosetting resin on the skins and on the edge of the honeycomb web, then to apply an adhesive foam to the adhesive band portion covering the edge of the web, to place the elastomer plug above the foam and the adhesive band, and finally to polymerize the whole by a heat treatment in order that the swelling of the foam should press the adhesive band back against the irregular profile of the edge of the honeycomb web, and that the foam layer should form a regular contour on the web. Possibly, and prior to the rigidification, a second adhesive band which is likewise impregnated is affixed above the foam and the adjacent edges of the first band, and then, after the elastomer plug is placed in position, a third adhesive band is affixed above the first band and the edges of the elastomer which cover this first band. However, these means permit solely the obtaining of a joint which is perfectly sealed between the elastomer plug and the trailing edge panel, by virtue of the foam and the rigidified adhesive band or bands.

SUMMARY OF THE INVENTION

The present invention is proposed to remedy the disadvantages mentioned hereinabove and exhibited by prior art blades constructed of composite materials, and the object of the invention is to propose a blade of economic manufacture, the structural elements of which may be constructed in an optimum manner with a relatively large precision tolerance and without finishing.

A further object of the invention is to propose a blade exhibiting an improved behavior with regard to impacts of all types and to erosion, and which can readily be repaired by the user in the event of minor damage to the external covering.

A further object of the invention is to propose a blade whose profile can be readily and rapidly modified and adapted, in order to obtain a different development of the profile spanwise, as well as chordwise on the blade.

The idea forming the basis of the invention is to produce blades constructed of composite materials, of an original structure, by the utilization of a novel production technique consisting in assembling, in a conventional manner, all the necessary elements, the function of which is to ensure the structural resistance of the blade, or in creating a structural core fulfilling this function and in surrounding these assembled structural elements or this structural core with a covering of profiled cladding, which is a non-vital protective covering for the blade, which is interchangeable and repairable or expendable, depending upon whether this covering of cladding has been slightly or severely damaged.

To this end, the subject of the invention is a blade constructed of composite materials, in particular for a rotor of an aerodyne having an at least partially rotating rotor system, which is defined in that it comprises:

a structural core, preferably of approximate aerodynamic profile, ensuring the structural resistance of the blade, and a covering of cladding surrounding the structural core, and itself comprising a rigid and thin external shell, having the desired aerodynamic profile, and a layer of a light and flexible, non-stress-bearing comformable material, ensuring the filling between the structural core and the external shell.

In this way, a blade is obtained whose structural core, constructed without great precision of shape and without surface finishing, can be combined with a plurality of different coverings of cladding, each one of which includes an external shell exhibiting one or more aerodynamic profiles, preferably of a same family, of differing curvatures spanwise and/or chordwise on the blade. At the same time, each covering of cladding likewise acts as a protective shield, the profiled shell of which may be constructed of a material chosen for its qualities of behavior in relation to erosion and of resistance to impacts, while its conformable and filling layer ensures the adaptation to the shape of the core and the compensation or the "absorption" of the differences of profiles between the structural core and the external shell.

In the event of minor damage to the covering of cladding, the latter may be repaired more readily and locally by means of parts of the materials making up the shell and the conformable and filling layer, while, following major damage, possibly with partial tearing off of the covering of cladding, the non-essential character of this covering does not obstruct the return of the aerodyne to its base, where the damaged blade can be demounted and its covering of cladding repaired, if the damage involved is limited. If the damage is more extensive, the blade will be returned to the factory, where, after complete removal of the cladding, the structural integrity of the core will be ensured and, if appropriate, restored, and then a new covering of cladding, which may or may not be identical to the original one, may be placed in position around the structural core in order to obtain a re-usable blade.

It is clear that the structural core of a blade according to the invention may be any primary structure including all the structural elements of any blade constructed of composite materials of construction known at present, in particular, when the blade is of the type comprising:

at least one spar constructed of rovings of fibers having a high mechanical resistance which are agglomerated by a polymerized synthetic resin, a stress-bearing, rigid shell, participating in the structural resistance of the blade, and comprising at least one layer of fabric of fibers having a high mechanical resistance which are agglomerated by a polymerized synthetic resin, and at least one filling element constructed of a light synthetic material, disposed within the stress-bearing shell, it is defined, according to the invention, in that the stress-bearing shell, the spar or spars and the filling element or elements are assembled in order to constitute the structural core of the blade.

Advantageously, the covering of cladding is a non-stress-bearing covering having an external shell constructed of thermoplastic resin, not participating in the structural resistance of the blade, and permitting, in addition, as compared with the traditional coverings of blades constructed of composite materials, the obtaining of excellent surface condition and an improved erosion behavior.

If, furthermore, the thermoplastic resin of the external shell is dyed in the mass, a saving is achieved, in the course of the manufacture, with regard to the operations of painting and of filling.

Moreover, in order to impart to the shell better resistance to impacts and to erosion, it may be preferable to reinforce the thermoplastic shell by means of inorganic or organic fibers, and, possibly, this shell may comprise an anti-erosion layer of fabric of inorganic or organic fibers which are agglomerated by a polymerized synthetic resin.

In order to obtain a light flexible conformable and filling layer, the latter is advantageously constructed of a cellular synthetic material or of flexible foam.

In order to facilitate the positioning of a covering of cladding around a structural core, it is furthermore advantageous that this covering of cladding should consist of two complementary laminated parts, which are mounted around the structural core and affixed to one another and preferably likewise on the structural core. Preferably, in order to simplify the construction of two half-coverings which are complementary and which exhibit evolutive half-profiles permitting different combinations in order to form different profiles around a same structural core, the two complementary laminated parts of each covering of cladding advantageously constitute an upper surface part and a lower surface part, which each comprise respectively the upper surface or lower surface parts of the external shell and of the layer of conformable and filling material, and which are affixed to one another at the locations of the leading and trailing edges of the blade.

In order to reinforce the non-essential character of the covering of cladding, it is desirable that the structural core should exhibit a transverse cross-section, along the chord of the blade, having a contour substantially parallel to the profile of the external shell of the covering of cladding, of which the layer of conformable and filling material is then preferably a sheet to compensate for the differences in tolerance between said contour and said profile.

However, it is likewise possible, in order to simplify the construction of the structural core, that the latter should exhibit a transverse cross-section, along the chord of the blade, having a faceted contour based on simple geometric shapes, such as triangular and quadrangular shapes, in which case the layer of conformable and filling material of the covering of cladding will preferably be a thicker cushion to compensate for the differences in shape between said contour and the profile of the external shell of the covering of cladding.

According to a particular embodiment, the structural core likewise comprises a composite central spar, the transverse ends of which are formed into a solid unit, each by means of a composite sole, one against the interior of the upper surface part and the other against the interior of the lower surface part of a stress-bearing rigid shell of the structural core, the central spar extending along the span of the blade, substantially at the center of the chord of the latter, and delimiting together with the stress-bearing rigid shell and with a leading-edge spar of the structural core, a leading-edge box filled with a front filling element of the structural core. In this example, the latter consists essentially of the leading-edge box formed in this way. However, according to a preferred embodiment, the structural core further comprises a rear filling element, disposed within the stress-bearing rigid shell behind the central spar of the said core. In this example, as in the preceding one, each filling element of the structural core can be constructed of a cellular synthetic material or of foam, or alternatively of laminated honeycomb.

The invention also a process for the manufacture of a blade as described hereinabove, and this process consists in:

constructing a structural core in the shape of a primary structure including all the structural elements of the blade, and surrounding said structural core by a covering of cladding with the aid of a layer of a light and flexible, non-stress-bearing conformable material, and with a rigid and thin external shell, which is profiled to the final aerodynamic profile of the blade.

In a preferred variant for the simplified implementation of this process, the latter consists in surrounding said structural core with said covering of cladding by mounting, around said structural core, two complementary laminated parts forming the covering and each one of which comprises a part of the layer of conformable material and a part of the profiled external shell, the two laminated and complementary parts being affixed to one another and preferably likewise on the structural core.

By way of example, each one of the two laminated and complementary parts is constructed by calendering or thermoforming the corresponding part of the profile external shell constructed of thermoplastic resin, and by affixing a part of the layer of conformable material on the internal face of said corresponding part of the external shell.

BRIEF DESCRIPTION OF THE DRAWINGS

The invention will be better understood, and further features and advantages of the invention will emerge, on reading the description given hereinbelow with reference to the accompanying drawings, in which:

FIG. 1 is a view in transverse cross-section, along the chord, of a first embodiment of a helicopter rotor blade;

FIG. 2 is a view, in perspective and partially cut away, of a section of the current part of the blade, the section of which is represented in FIG. 1;

DESCRIPTION OF PREFERRED EMBODIMENT

Figure 3:
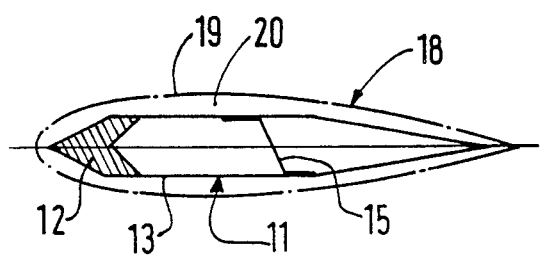
FIG. 3 is a view, in transverse cross-section similar to FIG. 1 and schematically representing a second embodiment of blade.

The blade shown in FIGS. 1 and 2 comprises a structural core 1 in the form of a primary structure including all the structural and essential elements of a helicopter blade of conventional structure, and the construction of this structural core 1 is very similar to the construction of this known blade.

Core 1 comprises a leading-edge spar 2, consisting of unidirectional rovings of inorganic or organic fibers having a high mechanical resistance, for example of glass fibers or aramid fibers such as those marketed under the trade name of KEVLAR, and these rovings are agglomerated by a thermosetting and polymerized impregnation synthetic resin.

Spar 2 has a substantially C-shaped transverse cross-section due to the convex curvature of its lower and upper surfaces, as well as of the concave recess of its rear face, which thus substantially delimits a lower surface rear wing 2a and an upper surface rear wing 2b. Furthermore, this spar likewise exhibits on its front face a small concave recess, the function of which is specified hereinbelow.

The spar 2 formed in this way comprises, in a known manner, a base or root portion by which it is intended to be connected to a rotor hub, and this spar 2 is intended to withstand essentially the centrifugal forces to which the blade is subjected in operation.

The structural core 1 likewise comprises a stress-bearing rigid shell 3 having a transverse profile which is without great precision in terms of shape, substantially parallel to the final aerodynamic profile desired for the blade. This stress-bearing shell 3 is constructed without finishing, i.e., without caulking, filling, sanding or inorganic or organic fibers of high mechanical resistance which are agglomerated by a polymerized synthetic resin. For example, the stress-bearing shell 3 may consist of two crossed layers of fabric of carbon fibers, the warp and weft threads of which are inclined substantially at 45° to the direction of the leading edge of the blade, these two layers being preimpregnated with a resin, for example of the epoxide type, polymerized while hot. The spar 2 is disposed in the zone of the leading edge of the shell 3, to which it is rigidly adhered by the polymerization of the resins, along its convex upper and lower surfaces and its rear wings 2a and 2b, and in such a manner that the concave recess of its front face delimits, together with the shell 3, a seating occupied by a counterweight 4.

The resistant skeleton of the blade likewise comprises a central spar 5, constructed of composite material, which extends substantially over the entire span of the blade at the center of its chord, exhibits a substantially Z-shaped transverse cross-section with a central portion forming the web 5c consisting of a honeycomb panel covered on each side with layers of fabric of carbon fibers preimpregnated with a thermosetting resin, and two wings 5a and 5b, each formed by the superposition of the extensions of the impregnated carbon fabric layers of the faces of the central portion 5c. The lower surface wing 5a rests against the upper face of a lower surface sole 6a constructed of composite material, formed of fibers disposed longitudinally, this sole itself being applied by its lower face against the internal face of the lower surface part of the shell 3 and, in a similar manner, the upper surface wing 5b rests against the lower face of an upper surface sole 6b constructed of composite material, likewise formed of fibers disposed longitudinally, which is applied by its upper face against the internal face of the upper surface part of the shell 3, but in a position closer to the spar 2 than the wing and the lower surface sole 5a and 6a. The simultaneous polymerization of the thermosetting resin for impregnation of the various parts of the central spar 5, and of its two soles 6a and 6b, as well as of the layers of fabric of the shell 3, ensures a rigid joining of the central spar 5 by means of its two soles 6a and 6b directly to the lower surface and upper surface parts of the rigid and stress-bearing shell 3. In this way, the central spar 5 delimits, together with the stress-bearing shell 3 and the spar 2, a structural box which is situated at the front or at the leading edge, which is preferably filled with a front filling body 7a, while this same central spar 5 delimits, together with the stress-bearing shell 3 alone, in the part facing the trailing edge of the latter, a structural box situated at the rear or at the trailing edge, which is preferably filled with a rear filling body 7b. The filling bodies 7a and 7b each consist of a light, cellular or foam synthetic material, for example polyurethane, or alternatively of synthetic and laminated honeycomb, in order to exhibit the desired shapes.

The construction of this structural core 1 is therefore similar to that of a conventional blade, except for the absence of finishing of the surface condition of the stress-bearing shell 3, and, above all, of the shape of the latter, which is only substantially parallel to the desired final aerodynamic profile, and constructed without great precision, with a tolerance on the approximate profile so obtained which may be relatively large, but which is still compensated by the mounting around this structural core 1 of a covering of cladding 8 described hereinbelow. It is clear that the construction of the structural core is thus adequately facilitated.

The covering of cladding 8 is a non-stress-bearing, composite and laminated covering, having two superposed layers, neither of which participates in the structural resistance of the blade. This covering 8 is formed by the assembly, around the structural core 1, of a lower surface half-covering of cladding 8a and of an upper surface half-covering of cladding 8b, which are complementary. Each of half-coverings 8a and 8b comprises a rigid and thin external layer of thermoplastic resin which may be dyed in the mass, which is thermoformed to the exact desired profile, in order to form respectively the lower surface part 9a or the upper surface part 9b of an external shell (9a–9b) which is rigid, thin and non-stress-bearing, but which withstands only the aerodynamic forces, and is profiled with precision according to the exact desired aerodynamic profile.

Each half-covering 8a or 8b likewise comprises an internal layer, constructed of a light, flexible and deformable synthetic foam, to form respectively a lower surface conformable layer 10b and an upper surface conformable layer 10a, which are intended to fill the gap between the profiled and non-stress-bearing external shell (9a–9b) and the stress-bearing internal shell 3, while compensating for or while absorbing the differences of shape between the contour of the internal shell 3 and the precise profile of the external shell (9a–9b).

The filling and conformable layer (10a–10b) of the covering of cladding 8 ensures in this way the adaptation of the non-stress-bearing profiled shell (9a–9b) around the structural core 1. In the zone of the leading edge, each external half-shell 9a or 9b exhibits a portion 9c with slight excess thickness towards the interior, and the thickness of the conformable foam sheet 10a and 10b is greater than its thickness in the vicinity of the trailing edge. The average thickness of the layer of deformable foam is approximately 5 mm, while the average thickness of the profiled external shell is approximately 1 mm.

In order to facilitate the mounting of the covering of cladding 8 around the structural core 1, each foam sheet 10a or 10b is affixed against the concave internal face of the corresponding half-shell 9a or 9b, in order to obtain the two half-coverings 8a and 8b, which are then mounted around the structural core 1 and each affixed on the opposite and corresponding lower or upper surface of the latter, and one against the other at the locations of the junction planes of the leading edge 10c and of the trailing edge 10d.

The utilization of a thermoplastic resin dyed in the mass to form the external and profiled shell (9a, 9b) provides the qualities and characteristics specific to this material, which give a perfect surface condition, and hence obviate the need for lengthy and delicate finishing steps such as sanding, filling and painting, and improve erosion behavior over that of conventional paints. Furthermore, the external shell (9a–9b) and the conformable and filling layer (10a–10b) constructed of foam, which are combined in order to form the covering of cladding 8, simultaneously form a shield to protect all the structural elements grouped within the core 1 against shocks of average magnitude which are the most numerous and which are due, for example, to the throwing up of stones or pebbles and to impacts with branches. In the event of local damage to the covering of cladding 8, as the latter is not structural, it is possible to proceed in situ even with simplified repairs, with the aid of pieces of the same constituent materials. In the event of more significant damage, the blade is demounted and returned to the factory, where the covering of cladding 8 is removed in order to permit inspection of the integrity of the structural core 1 and, where appropriate, repair to restore this integrity. Furthermore, the covering of cladding 8 may be repaired, more or less locally, or replaced by another identical covering if the original covering is too damaged and unusable, in order to obtain a re-usable blade. Given the non-essential character of the covering of cladding 8, the aerodynamic characteristics, which are certainly degraded but still sufficient, of the approximate profile of the structural core 1 enable the return of the aerodyne to its base even if the cladding is partly torn off in flight.

In order to improve resistance to impacts and to erosion, it is possible to reinforce the resin of the profiled external shell 9a–9b by a limited addition of inorganic or organic fibers, or even to superpose on this shell 9a–9b a layer of fabric of fibers agglomerated by a polymerized impregnation synthetic resin and thus acting as an anti-erosion layer.

For the assembly by affixing of the two half-coverings 8a, 8b on the structural core 1, it is possible to advantageously utilize the same mold for the final desired aerodynamic profile and, in a general way, the same equipment as has been utilized to construct the two half-coverings 8a, 8b and, in particular, the two rigid half-shells 9a, 9b of the latter.

A blade is thus obtained the non-stress-bearing covering of cladding 8 of which is not essential but is expendable, interchangeable and easily repairable, which permits the profile of the blade to be caused to develop, along the span as well as along the chord, in a modular manner by the combination of lower surface 8a and upper surface 8b half-coverings having the desired curvature or curvatures. This blade structure permits the changing of the profile of a blade, or the adaptation or conversion thereof, subject, however, to the condition that the system remain within profiles of the same generation, proceeding from a same basic structural core 1. This advantage is important when it is desired to compare different aerodynamic solutions and, at the production level, to construct a plurality of types of blade having a common resistant structure, in order to equip a range of a plurality of aerodynes which are different but fairly similar, as well as to reassess an aerodyne when development of a rotor is required.

It should likewise be noted that the penalty in terms of mass due to the presence of the covering of cladding may be compensated by the optimization of the constituent elements of the structural core 1. In fact, as the latter is protected by the covering of cladding 8, its constituent elements may each be constructed with thicknesses which are minimal or optimized in terms of characteristics, without concern for the various aggressions and impacts to which the blade may be subjected in use. The structural core 1 can be inspected only before it is enclosed by the covering of cladding 8. After positioning and affixing the latter, the final inspection of the blade consists of an external check.

FIG. 3 shows schematically, in transverse cross-section, a second embodiment of a blade constructed of composite materials, comprising a structural core 11, indicated in solid lines, combining all the stress-bearing elements of the blade, and surrounded by a covering of cladding 18, indicated in dot-dash lines, which is a non-essential and non-stress-bearing attached covering, consisting of a thin, rigid external shell 19 profiled to the precise desired aerodynamic profile, constructed of a thermoplastic resin, and of a layer of a conformable and filling foam 20 which is chosen for its specific characteristics of lightness and of flexibility.

As in the preceding example, the structural core 11 is formed by the assembly, in a conventional manner, of a leading edge spar 12, of a rigid stress-bearing shell 13 and of a Z-shaped central spar 15, which is connected to the shell 13, possibly with the interposition of soles and, possibly, filling of the leading edge and trailing edge boxes thus formed by filling bodies, constructed of rigid and light foam or of laminated honeycomb.

However, in contrast to the embodiment of FIGS. 1 and 2, the contour of the transverse cross-section of the composite structural core 11 is not substantially parallel to the precise aerodynamic profile of the external shell 19 constructed of composite material. On the contrary, it differs very markedly therefrom in the extent to which the structural core 11, has a faceted contour, and more specifically a contour in the shape of a flattened hexagon, by reason of the triangular cross-section of the front parts of the spar 12 and of the stress-bearing shell 13, as well as of the likewise triangular cross-section of the rear part of this shell 13, behind the central web 15 and up to the trailing edge, while the central part of the core 11, substantially between the front spar 12 and the central spar 15, has a rectangular cross-section. However, this contour based on simple geometrical shapes delimits a profile which, although very approximate as compared to that of the external shell 19, remains sufficiently effective as far as aerodynamic characteristics are concerned, to maintain the non-essential character for the covering of cladding 18 and to permit the safeguarding of the aerodyne when this covering 18 is torn off the basic structural core 11. However, in this case, in order to compensate for the larger differences between the shapes of the contour of the core 11 and of the profile of the shell 19, it is necessary that the foam layer 20 be a relatively thick cushion permitting the compensation of these significant differences in shape. The construction of such a blade permits a saving in manufacture, by reason of the simple shapes of the structural core, which saving is even greater than that obtained by the manufacture of the blade of FIGS. 1 and 2, in comparison with conventional blades.

Figure 4:
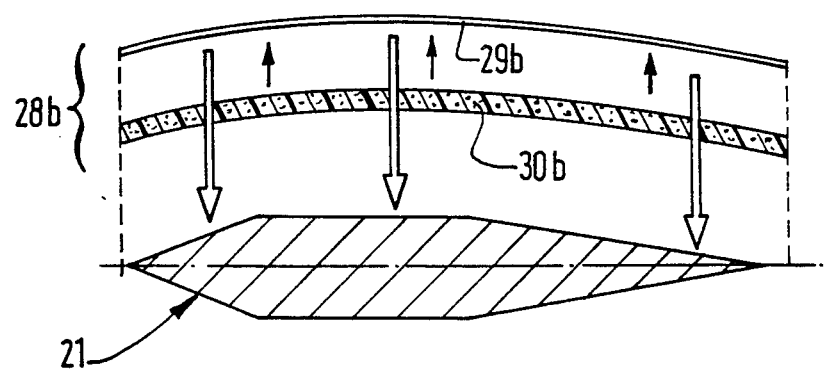
FIG. 4 is a schematic exploded view, in transverse cross-section, illustrating the manufacturing process and the structure of a third embodiment of the blade.

FIG. 4 illustrates schematically certain steps of the manufacturing process, consisting, after the construction by any known means of a structural core 21, of transverse cross-section likewise in the shape of an irregular and flattened hexagon, in covering the upper surface of this structural core with an upper surface covering of cladding 28b, which comprises a cushion of flexible and deformable foam 30b, and a rigid and profiled upper surface half-shell 29b. The two faces of the cushion of foam 30b are covered with a film of adhesive, and this cushion 30b is first affixed against the concave internal face of the upper surface half-shell 29b, and then the half-covering 28b obtained in this manner is affixed to the upper surface of the core 21. The same procedure is carried out for the covering of the lower surface of this core 21, with the aid of a lower surface half-covering likewise comprising a rigid and profiled lower surface half-shell and a cushion of foam, and the two half-coverings are likewise affixed to one another at the locations of the leading edge and of the trailing edge of the blade constructed in this manner.

With regard to the manufacture of the half-shells such as 29b, it can be constructed by thermoforming of a film of thermoplastic resin, or alternatively by calendering of a sheet of thermoplastic resin.

I claim:
1. Blade made of composite materials and having an aerodynamic profiled section, said blade comprising
   (a) a stress-bearing core, constituted by a resistant structure for providing alone the overall mechanical behavior of the blade, mainly against tensile efforts produced by centrifugal forces, bending moments due to flapping and drag movements of the blade, and torsional moments about a longitudinal axis of the blade, said core having an external contour which is contained with spacing within said aerodynamic profiled section,
   (b) an aerodynamic conformation covering, surrounding said stress-bearing core without participating in overall structural resistance of said blade, said covering comprising
      (i) a thin rigid external shell having a cross-section defining said aerodynamic profiled section; and
      (ii) an internal filling and conformable layer made of a light flexible non-stress bearing deformable material which fills said spacing between said core external contour and said covering external shell and connects said stress-bearing core to said covering external shell.
2. The blade as claimed in claim 1, wherein said core (1) comprises
   (a) at least one spar constructed of rovings of fibers having a high mechanical resistance which are agglomerated by a polymerized synthetic resin;
   (b) an internal stress-bearing, rigid shell, participating in the structural resistance of the blade and comprising at least one layer of fabric of fibers having a high mechanical resistance which are agglomerated by a polymerized synthetic resin; and
   (c) at least one filling element made of a light synthetic material disposed within said stress-bearing shell;

(d) wherein said stress-bearing shell, said at least one spar and said at least one filling element are assembled so as to constitute said structural core.

3. The blade claimed in claim 1 or 2, wherein said thin, rigid shell of said aerodynamic conformation covering is made of a layer of thermo plastic resin.

4. The blade claimed in claim 3, wherein said thermoplastic resin of said external shell is dyed in the mass.

5. The blade claimed in claim 3, wherein said thermoplastic resin of said external shell is painted.

6. The blade claimed in claim 3, wherein said thermoplastic resin of said external shell is reinforced with fibers selected from a group consisting of inorganic and organic fibers.

7. The blade claimed in claim 1 or 2, wherein said thin, rigid external shell of said aerodynamic conformation covering comprises at least one anti-erosion layer made of fabric of fibers selected from a group consisting of organic and organic fibers which are agglomerated by a polymerized synthetic resin.

8. The blade claimed in claim 1 or 2, wherein said filling and conformation layer is made of a material selected from a group consisting of cellular material and flexible foam.

9. The blade claimed in claim 1 or 2, wherein said aerodynamic conformation covering consists of two laminated and complementary parts, which are mounted around the structural core, and affixed to one another and on said structural core.

10. The blade claimed in claim 9, wherein said two laminated and complementary parts of said aerodynamic conformation covering comprise an upper surface part and a lower surface part, each of said parts comprising the upper and lower surface parts of the external shell and of the filling and conformation layer and being affixed to one another at a location of a leading edge and a trailing edge of said blade.

11. The blade claimed in claim 1 or 2, wherein said structural core has a transverse cross-section, along a chord of said blade, having a contour substantially parallel to the profile of said external shell of the aerodynamic conformation covering of which the filling and conformation layer is a sheet to compensate for differences in tolerance between said contour and said profile.

12. The blade claimed in claim 1 or 2, wherein the structural core has a transverse cross-section, along a chord of said blade, having a faceted contour based on simple geometric shapes, the filling and conformation layer of the aerodynamic conformation covering constituting a cushion to compensate for differences in shape between said contour and the profile of said external shell of said covering.

13. The blade as claimed in claim 1 to 2, wherein said structural core comprises a composite central spar, transverse ends of which are formed into a solid unit, each by means of a composite sole, a first said sole being disposed against the interior of the upper surface part and a second said sole being disposed against the interior of the lower surface part of a stress-bearing, rigid shell of said structural core, said central spar extending along the span of the blade, substantially at the center of the chord of the latter, and delimiting, together with said stress-bearing, rigid shell and a leading-edge spar of the structural core, a leading-edge box filled with a front filling element of said core.

14. The blade claimed in claim 13, wherein said structural core comprises a rear filling element disposed within said stress-bearing, rigid shell, behind said central spar of said core.

15. The blade claimed in claim 14, wherein each filling element of said structural core is constructed of a material selected from a group consisting of cellular material, foam, and laminated honeycomb.

16. Blade made of composite materials for a rotor of a rotorcraft and having an aerodynamic profiled section, said blade comprising
   (a) a stress bearing core providing structural resistance of said blade against centrifugal forces, flapping and drag bending moments and torsional moments about a longitudinal axis of said blade, said core having a chordwise cross-section contained with spacing within said blade aerodynamic profiled section and comprising
      (i) at least one spar made of rovings of fibers having high mechanical resistance and agglomerated by a polymerized synthetic resin;
      (ii) a stress-bearing rigid shell, participating in said structural resistance, and made of at least one layer of fabric of fibers having high mechanical resistance and agglomerated by a polymerized synthetic resin, said layer of fiber fabric surrounding said spar and being made integral with said spar; and
      (iii) at least one filling element made of a lightweight synthetic material disposed within said stress-bearing rigid shell and made integral with said stress-bearing rigid shell and said spar; and
   (c) an aerodynamic conformation covering, surrounding said stress-bearing core and comprising:
      (i) an external thin rigid shell, having a chordwise cross-section defining said blade aerodynamic profiled section; and
      (ii) a filling and conformation layer made of a non-stress-bearing light flexible and deformable material which fills said spacing between said stress-bearing core and said external rigid shell and connects said stress-bearing rigid shell of said stress-bearing core to said external rigid shell of said aerodynamic conformation covering.

17. The blade claimed in claim 16, wherein said thin, rigid shell of said aerodynamic conformation covering is made of a layer of thermo plastic resin.

18. The blade claimed in claim 16, wherein said thermoplastic resin of said external shell is dyed in the mass.

19. The blade claimed in claim 16, wherein said thermoplastic resin of said external shell is painted.

20. The blade claimed in claim 16, wherein said thermoplastic resin of said external shell is reinforced with fibers selected from a group consisting of inorganic and organic fibers.

21. The blade claimed in claim 16, wherein said thin, rigid external shell of said aerodynamic conformation covering comprises at least one anti-erosion layer made of fabric of fibers selected from a group consisting of organic and organic fibers which are agglomerated by a polymerical synthetic resin.

22. The blade claimed in claim 16, wherein said filling and conformation layer is made of a material selected from a group consisting of cellular material and flexible foam.

23. The blade claimed in claim 16, wherein said aerodynamic conformation covering consists of two laminated and complementary parts, which are mounted around the structural core, and affixed to one another and on said structural core.

24. The blade claimed in claim 16, wherein said two laminated and complementary parts of said aerodynamic conformation covering comprise an upper surface part and a lower surface part, each of said parts comprising the upper and lower surface parts of the external shell and of the filling and conformation layer and being affixed to one another at a location of a leading edge and a trailing edge of said blade.

25. The blade claimed in claim 16, wherein said structural core has a transverse cross-section, along a chord of said blade, having a contour substantially parallel to the profile of said external shell of the aerodynamic conformation covering of which the filling and conformation layer is a sheet to compensate for differences in tolerance between said contour and said profile.

26. The blade claimed in claim 16, wherein the structural core has a transverse cross-section, along a chord of said blade, having a faceted contour based on simple geometric shapes, the filling and conformation layer of the aerodynamic conformation covering constituting a cushion to compensate for differences in shape between said contour and the profile of said external shell of said covering.

27. The blade as claimed in claim 16, wherein said structural core comprises a composite central spar, transverse ends of which are formed into a solid unit, each by means of a composite sole, a first said sole being disposed gains the interior of the upper surface part and a second said sole being disposed against the interior of the lower surface part of a stress-bearing, rigid shell of said structural core, said central spar extending along the span of the blade, substantially at the center of the chord of the latter, and delimiting, together with said stress-bearing, rigid shell and a leading-edge spar of the structural core, a leading-edge box filled with a front filling element of said core.

28. The blade claimed in claim 16, wherein said structural core comprises a rear filling element disposed within said stress-bearing, rigid shell, behind said central spar of said core.

29. The blade claimed in claim 16, wherein each filling element of said structural core is constructed of a material selected from a group consisting of cellular material, foam, and laminated honeycomb.

30. Blade made of composite materials for a rotor of a rotorcraft and having an aerodynamic profiled section, said blade comprising
(a) a stress bearing core providing structural resistance of said blade against centrifugal forces, flapping and drag bending moments and torsional moments about a longitudinal axis of said blade, said core having a chordwise cross-section contained with spacing within said blade aerodynamic profiled section and comprising
  (i) at least one spar made of rovings of fibers having high mechanical resistance and agglomerated by a polymerized synthetic resin;
  (ii) a stress-bearing rigid shell, participating in said structural resistance, and made of at least one layer of fabric of fibers having high mechanical resistance and agglomerated by a polymerized synthetic resin, said layer of fiber fabric surrounding said spar and being made integral with said spar; and
  (iii) at least one filling element made of a lightweight synthetic material disposed within said stress-bearing rigid shell and made integral with said stress-bearing rigid shell and said spar; and
(c) an aerodynamic conformation covering, surrounding said stress-bearing core and comprising:
  (i) an external thin rigid shell, having a chordwise cross-section defining said blade aerodynamic profiled section; and
  (ii) a filling and conformation layer made of a non-stress-bearing light flexible and deformable material which fills said spacing between said stress-bearing core and said external rigid shell and connects said stress-bearing rigid shell of said stress-bearing core to said external rigid shell of said aerodynamic conformation covering.

31. A process for manufacturing a blade made of composite materials and having an aerodynamic profiled cross section, said process comprising the steps of
(a) constructing a structural core in the shape of a primary structure including all structural elements of said blade; and
(b) surrounding said structural core with an aerodynamic conformation covering with the aid of a layer of a light and flexible, non-stress-bearing conformable material, and with a rigid and thin external shell which is profiled to a final aerodynamic profile of said blade.

32. The process claimed in claim 29, comprising surrounding said structural core with said aerodynamic conformation covering by mounting, around said structural core, two complementary laminated parts forming covering sand each one of which comprises a part of said layer of conformable material and a part of said profiled external shell, said two laminated and complementary parts being affixed against one another and said structural core.

33. The process claimed in claim 30, wherein each one of said two complementary laminated parts is made by calendaring or thermoforming a corresponding part of said profiled external shell constructed of thermoplastic resin, and by affixing a part of said filling and conformation layer on an internal face of said corresponding part of said external shell.

* * * * *